(12) United States Patent
Kim et al.

(10) Patent No.: US 12,395,566 B2
(45) Date of Patent: Aug. 19, 2025

(54) ELECTRONIC DEVICE AND METHOD FOR PROVIDING PERSONALIZED USER CONTEXT AWARE SERVICE

(71) Applicant: SAMSUNG ELECTRONICS CO., LTD., Suwon-si (KR)

(72) Inventors: Hyunwoo Kim, Suwon-si (KR); Honghee Gil, Suwon-si (KR); Jinho Mun, Suwon-si (KR); Mihwa Park, Suwon-si (KR); Sungdeuk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/952,920

(22) Filed: Sep. 26, 2022

(65) Prior Publication Data

US 2023/0055848 A1    Feb. 23, 2023

Related U.S. Application Data

(63) Continuation of application No. PCT/KR2022/011645, filed on Aug. 5, 2022.

(30) Foreign Application Priority Data

Aug. 23, 2021  (KR) .................. 10-2021-0111072

(51) Int. Cl.
*H04L 67/51*   (2022.01)
*G06F 11/34*   (2006.01)
(Continued)

(52) U.S. Cl.
CPC .......... *H04L 67/51* (2022.05); *G06F 11/3438* (2013.01); *H04L 67/306* (2013.01); *H04L 67/535* (2022.05); *H04M 1/72454* (2021.01)

(58) Field of Classification Search
None
See application file for complete search history.

(56) References Cited

U.S. PATENT DOCUMENTS 8,473,949 B2    6/2013  Horvitz et al.
9,971,586 B2 *  5/2018  An .................... H04M 1/72406
(Continued)

FOREIGN PATENT DOCUMENTS

CN    110069713 A       7/2019
CN    110677663 A  *    1/2020   ........... H04N 19/176
(Continued)

OTHER PUBLICATIONS

International Search Report (PCT/ISA/210) and Written Opinion (PCT/ISA/237) issued by the International Searching Authority on Nov. 15, 2022 for International Patent Application No. PCT/KR2022/011645.
(Continued)

*Primary Examiner* — Lance Leonard Barry
(74) *Attorney, Agent, or Firm* — Sughrue Mion, PLLC

(57) ABSTRACT

An electronic device includes a display and a processor configured to identify whether an application installed and mapped to a predefined user context predefined in the electronic device is being executed in the electronic device, based on the application being executed in the electronic device, recognize the predefined user context by using information on mapping between the application and the predefined user context, collect a usage log of the electronic device and store the usage logs, identify a usage pattern according to a user characteristic by analyzing the stored usage logs, generate a personalized user context corresponding to an undefined situation not predefined in the electronic device based on the usage pattern and control the display to output a recommendation function related to the recognized predefined user context or the personalized user context in
(Continued)

the display in response to recognizing the predefined user context or the personalized user context.

14 Claims, 13 Drawing Sheets

(51) Int. Cl.
*H04L 67/306* (2022.01)
*H04L 67/50* (2022.01)
*H04M 1/72454* (2021.01)

(56) References Cited

U.S. PATENT DOCUMENTS

| | | | |
|---|---|---|---|
| 10,332,013 B2 | 6/2019 | Dong et al. | |
| 10,642,715 B1* | 5/2020 | Simca | G06F 11/3612 |
| 2004/0153373 A1 | 8/2004 | Song et al. | |
| 2009/0292527 A1* | 11/2009 | Anderson | G06F 40/274 |
| | | | 704/9 |
| 2009/0292672 A1* | 11/2009 | Kunjithapatham | |
| | | | G06F 16/7867 |
| 2012/0072381 A1* | 3/2012 | Cao | G06F 40/00 |
| | | | 706/12 |
| 2013/0147838 A1* | 6/2013 | Small | G06F 3/013 |
| | | | 345/633 |
| 2014/0100835 A1 | 4/2014 | Majumdar et al. | |
| 2014/0188956 A1* | 7/2014 | Subba | G06F 16/185 |
| | | | 707/829 |
| 2015/0324786 A1* | 11/2015 | Desai | G06Q 20/322 |
| | | | 705/41 |
| 2017/0160881 A1 | 6/2017 | Kanemoto | |
| 2017/0243170 A1* | 8/2017 | Rashid | H04W 4/021 |
| 2018/0336200 A1* | 11/2018 | Lim | G06F 16/9535 |
| 2019/0102464 A1 | 4/2019 | Goenka et al. | |
| 2019/0220776 A1* | 7/2019 | Huang | G01R 31/318583 |
| 2020/0272914 A1* | 8/2020 | Jeyakumar | G06Q 30/02 |
| 2022/0263914 A1* | 8/2022 | Thatikonda | H04L 67/63 |

FOREIGN PATENT DOCUMENTS

| | | | |
|---|---|---|---|
| CN | 111259235 A | 6/2020 | |
| EP | 1694032 A2 * | 8/2006 | ........... H04L 67/306 |
| EP | 3 179 434 A1 | 6/2017 | |
| JP | 6684449 B2 | 4/2020 | |
| KR | 10-1349285 B1 | 1/2014 | |
| KR | 10-2014-0125261 A | 10/2014 | |
| KR | 10-2016-0037861 A | 4/2016 | |
| KR | 10-2019-0064042 A | 6/2019 | |
| KR | 10-2031897 B1 | 10/2019 | |
| KR | 10-2020-0043687 A | 4/2020 | |
| KR | 10-2227552 B1 | 3/2021 | |
| WO | WO-9936867 A1 * | 7/1999 | ....... G06F 17/30902 |

OTHER PUBLICATIONS

Extended European Search Report dated Jan. 4, 2024 in European Application No. 22861588.6.

* cited by examiner

ELECTRONIC DEVICE AND METHOD FOR PROVIDING PERSONALIZED USER CONTEXT AWARE SERVICE

CROSS-REFERENCE TO RELATED APPLICATIONS

This application is a bypass continuation of International Application No. PCT/KR2022/011645, filed on Aug. 5, 2022, which is based on and claims priority to Korean Patent Application No. 10-2021-0111072, filed on Aug. 23, 2021, in the Korean Intellectual Property Office, the disclosures of which are incorporated by reference herein in their entireties.

BACKGROUND

1. Field

Various embodiments relate to an electronic device and a method for providing a personalized user context-aware service.

2. Description of the Related Art

Electronic devices recognize the peripheral situation of users and provide services appropriate for users (e.g., context aware service (CAS)). For example, an electronic device may recognize or determine a situation where the user is using the electronic device, or the user context that may characterize the user's behavior by using information collected through the electronic device, and may provide the user with a service or function suitable for the situation based thereon.

In this disclosure, context may refer to information that characterizes the situation or information that serves as a reference for determining a meaningful service behavior. Recognizing user context may be one of important functions of the CAS.

In the case of the CAS, context to be used in a specific service is predefined or prestored in an electronic device, and the context is recognized in a predetermined scheme.

For example, an electronic device predefines a running-related application in an "exercise" situation and, if the user executes the running-related application, recognizes "currently exercising" context.

Such a manner of predefining context has a problem in that a relation regarding connection with situation recognition needs to be predefined and configured for each application. In addition, the electronic device determines whether the predefined context is appropriate through app execution information, thereby recognizing the situation, but may be unable to recognize the situation regarding an undefined situation or application.

As a result, there is a problem in that the electronic device can only recognize a predefined situation and unilaterally provides the same CAS, but cannot provide a user-tailored CAS.

SUMMARY

Various embodiments may provide a CAS optimized to an individual user by recognizing contexts that have not been predefined by reflecting not only context predefined by an electronic device, but also user characteristics, in connection with a CAS.

According to an aspect of the disclosure, there is provided an electronic device that may include a display, a processor and a memory storing instructions executable by the processor where the processor may be connected to the memory and configured to collect a usage log of the electronic device, identify a usage pattern according to a user characteristic by analyzing the usage log, generate a personalized user context corresponding to an undefined situation that is not predefined in the electronic device based on the usage pattern, and output a recommendation service to the display in response to recognizing the personalized user context.

According to an aspect of the disclosure, there is provided a method for providing a situation-aware service of an electronic device that may include collecting a usage log of the electronic device, identifying a usage pattern according to a user characteristic by analyzing the usage log, generating a personalized user context corresponding to an undefined situation that is not predefined in the electronic device based on the usage pattern, and outputting a recommendation service to the display in response to recognizing the personalized user context.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

Figure 1:
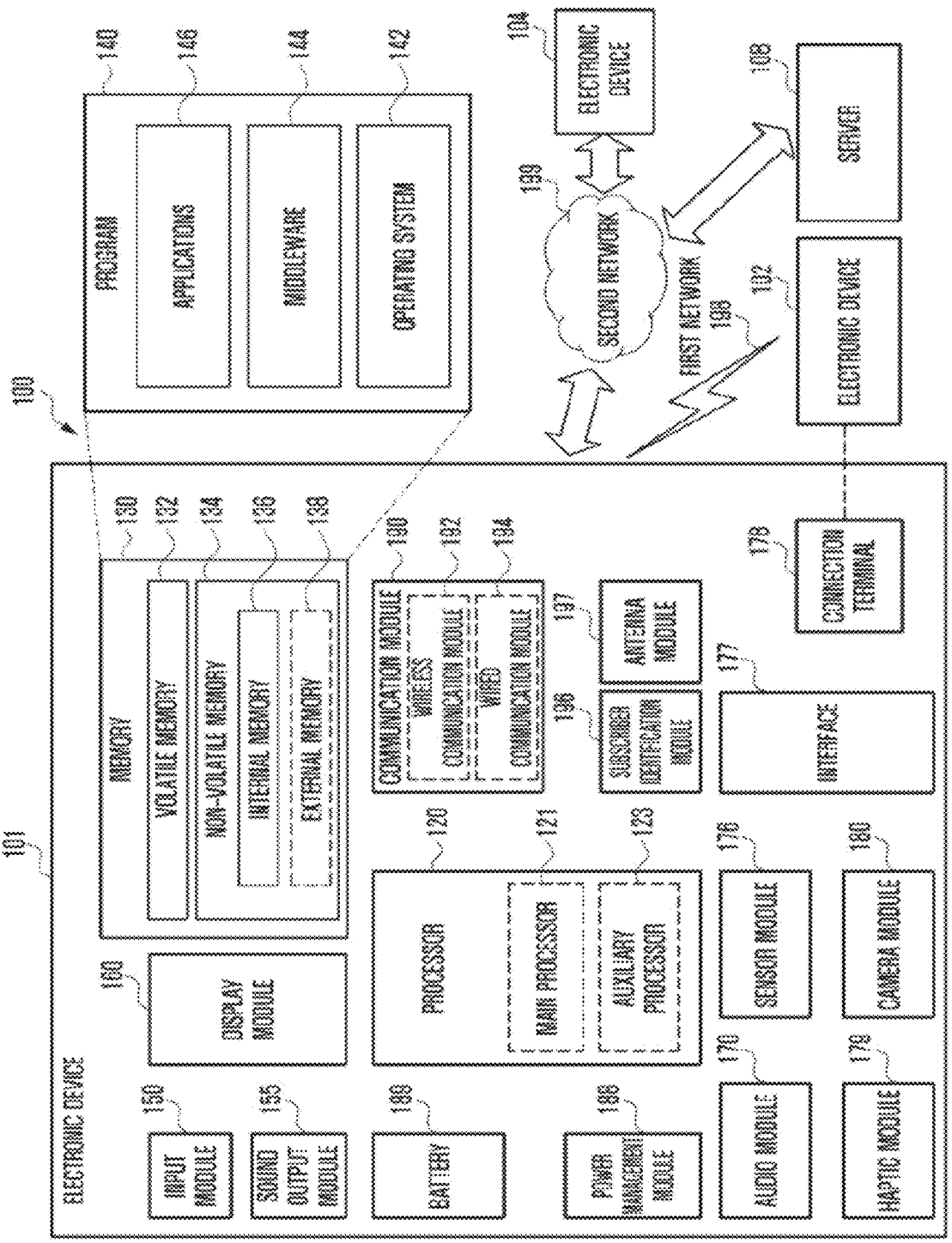
FIG. 1 is a block diagram illustrating an electronic device in a network environment according to various embodiments.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In an embodiment, at least one of the components (e.g., the connection terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or applications 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from the speaker, or as part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as the electronic device 101, or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
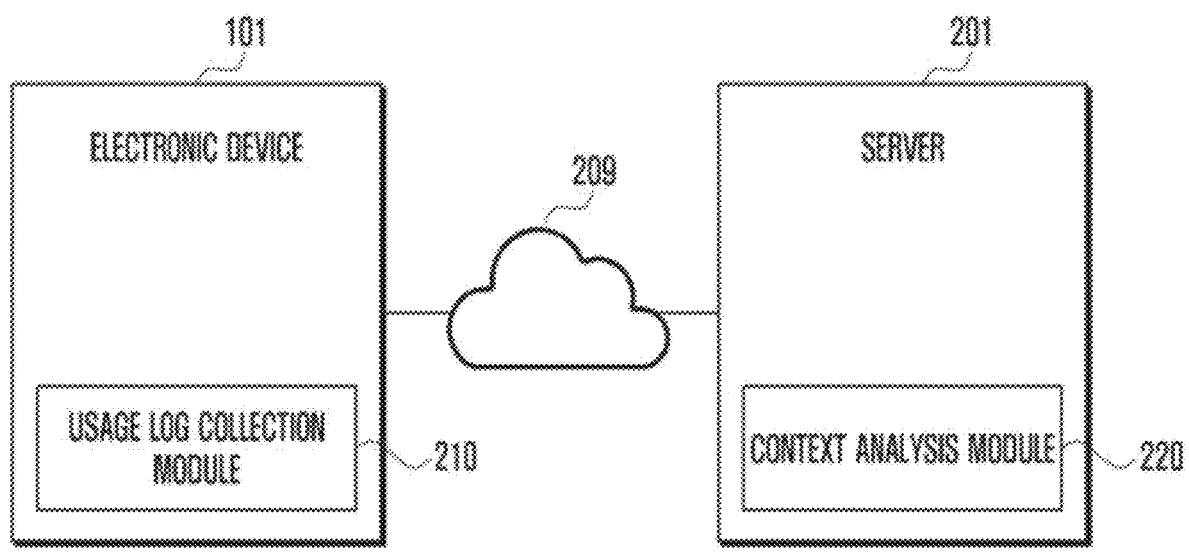
FIG. 2 illustrates a network environment configured to support a personalized context-aware service according to various embodiments.

FIG. 2 illustrates a network environment configured to support a personalized context-aware service according to various embodiments.

Referring to FIG. 2, according to various embodiments, an electronic device (e.g., the electronic device 101 of FIG. 1) may communicate with a server 201 (e.g., the server 108 of FIG. 1) in a network 209 environment. The electronic device 101 may include at least some of the components of the electronic device of FIG. 1.

The server 201 may be a server supporting a context-aware service. Although not shown, the server 201 may also communicate with one or more other user electronic devices.

The electronic device 101 and the server 201 may recognize a user context (hereinafter, the user context may be referred to as context or context information) corresponding to a user situation by interworking with each other, and may recommend or guide a personalized service or function corresponding to a personalized user context to the user.

According to an embodiment, the electronic device 101 may include a usage log collection module 210. The server 201 may include a context analysis module 220. The usage log collection module 210 and the context analysis module 220 may provide a context-aware service to the user in the electronic device by interworking or collaborating with each other, and some of the components of the context analysis module 220 may be implemented to be performed by the electronic device 101.

According to an embodiment, the electronic device 101 may collect usage logs generated while the user uses the electronic device 101. The electronic device 101 may transmit the usage logs to the server 201 and may receive result information obtained by analyzing the usage logs by the context analysis module 220 of the server 201.

The electronic device 101 may recognize the user context based on the result analyzed based on the usage logs.

Here, the user context may refer to information defining a characteristic of the electronic device 101 or the user situation, or information that is a basis for determining a meaningful service action.

The user context may include a first type of context and a second type of context. The first type of context may refer to a defined context that is predefined in the electronic device 101, and the second type of context may refer to an undefined or personalized context or customized context in which a user's personal characteristic is reflected.

In relation to the first type of context, when an application (hereinafter, referred to as "app") to which a specific context is mapped is executed, the electronic device 101 may recognize a predefined specific context.

For example, when an exercise-related app is executed, the electronic device 101 may recognize a user context that the user is "in exercise" based on the execution of the exercise-related app.

In relation to the second type of context, the electronic device 101 may analyze the usage log through the context analysis module 220 in conjunction with the server 201 to check a usage pattern corresponding to the user's personal characteristic, and may predict and generate a user context personalized according to the usage pattern. The electronic device 101 may recognize the personalized user context through the context analysis module 220.

For example, when the user frequently acts to exceed a predetermined level for executing a music app while the user is located at a company, the server 201 may analyze the usage log of the electronic device 101 to check the user's usage pattern, may predict and generate a personalized user context "listening to music while working at the company", and may transmit a result obtained by recognizing the personalized user context to the electronic device 101. The electronic device 101 may receive context recognition information transmitted from the server 201, and may recognize the personalized user context "listening to music while working at the company" based on the received context recognition information.

According to an embodiment, the electronic device 101 may analyze the usage log to predict and generate a context according to the user's usage pattern. When the predicted context cannot be defined as meaningful information (e.g., when the predicted context cannot be defined as a text such as "listening to music while watching a movie at the company"), the electronic device 101 may recognize the predicted context as an arbitrary name such as context 1 or context 2.

According to an embodiment, when the predicted context is recognized as the arbitrary name such as context 1 or context 2, the electronic device 101 may provide the recognized arbitrary context information to the user and may display a user interface on a display so that the user can directly configure a context name.

Although the embodiment of FIG. 2 is described as analyzing the usage log of the electronic device 101 by the server 201, in the following drawings, an example in which the electronic device 101 analyzes the usage log to recognize the user context will be described.

Figure 3:
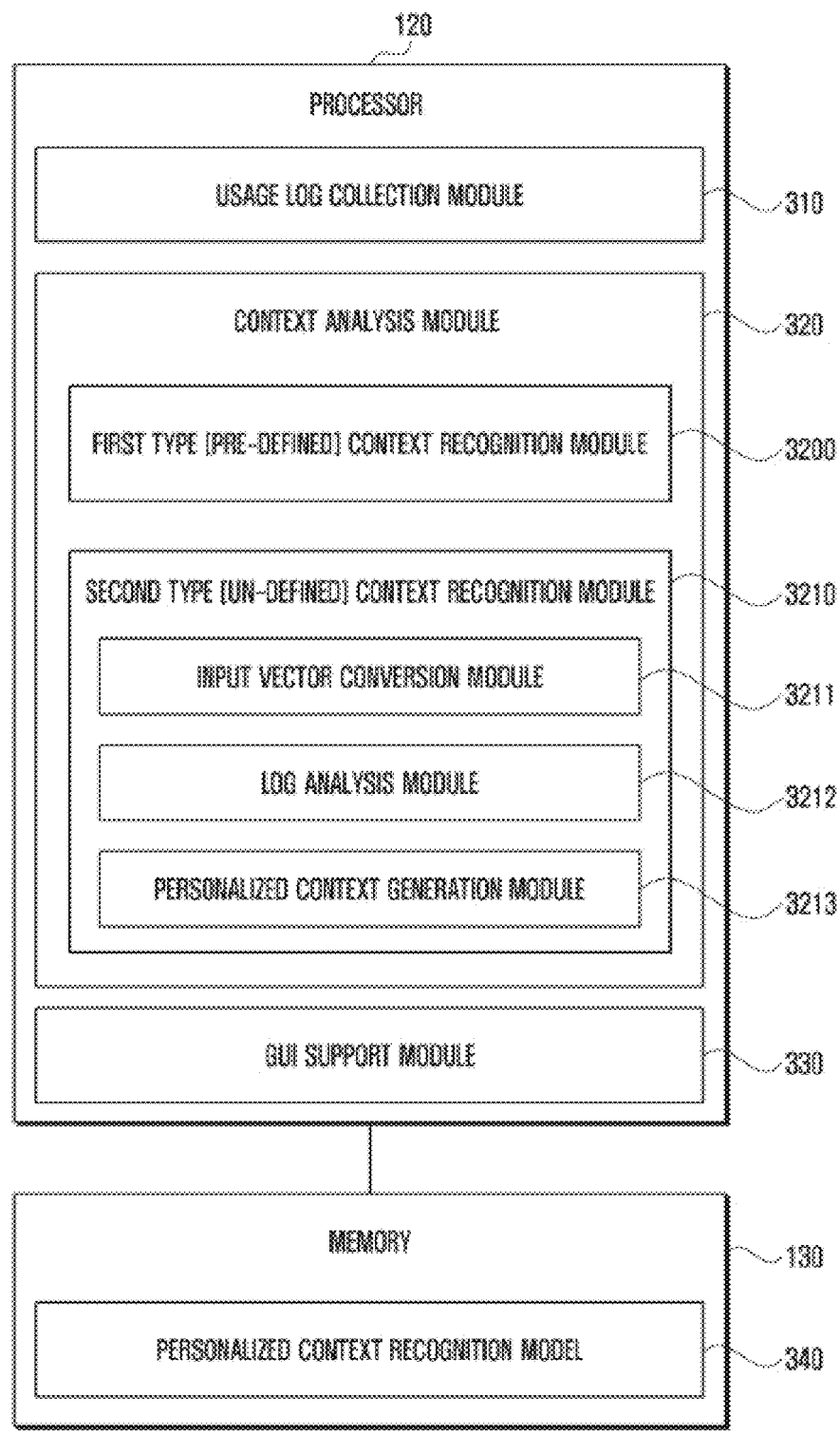
FIG. 3 illustrates a configuration of a processor of an electronic device according to various embodiments.
Figure 4:
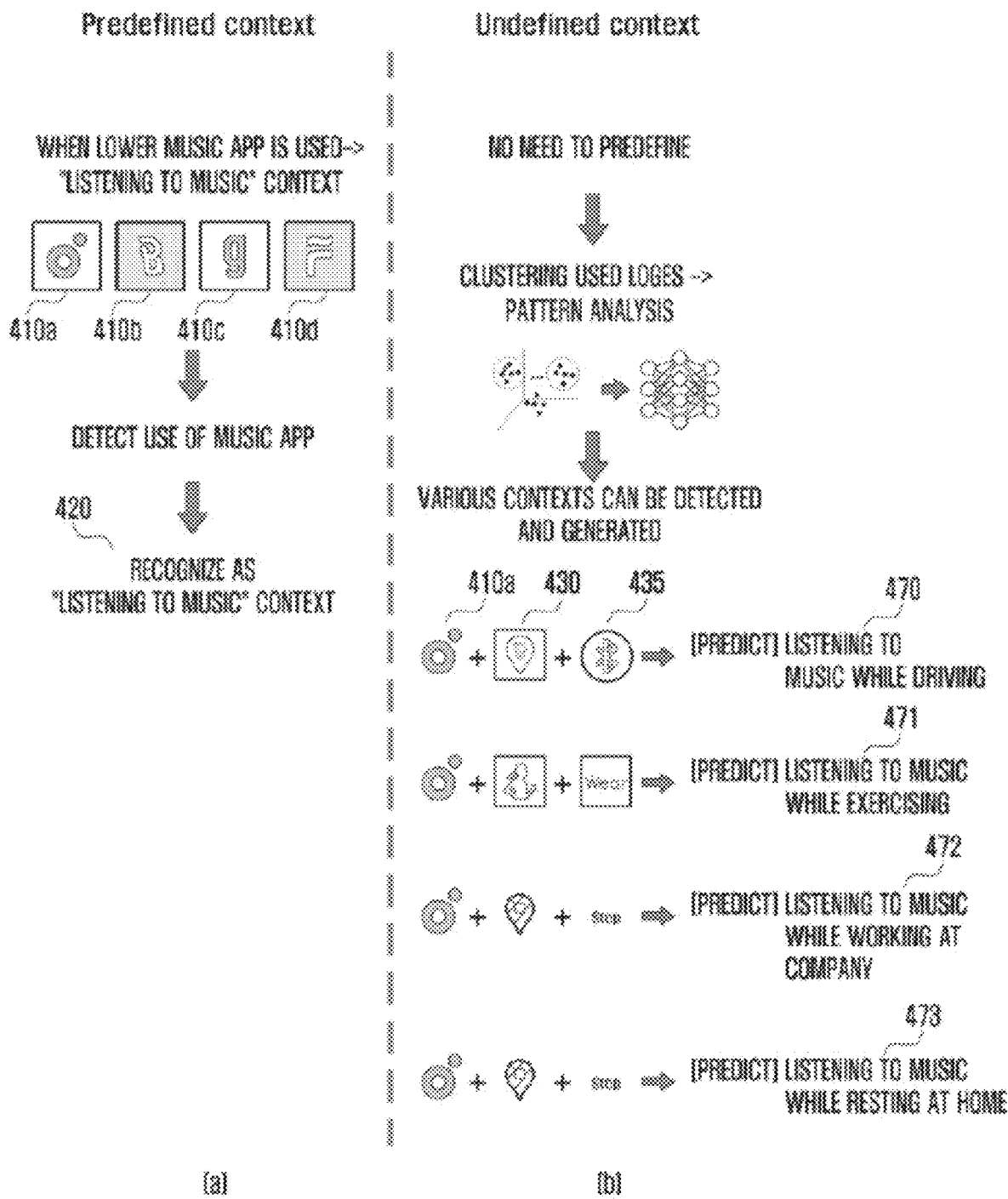
FIG. 4 illustrates an example of comparing context-aware situations according to various embodiments.

FIG. 3 illustrates a configuration of a processor of an electronic device according to various embodiments, and FIG. 4 illustrates an example of comparing context-aware situations according to various embodiments.

Functions or operations described in FIG. 3 may be understood as functions performed by a processor (the processor 120 of FIG. 1) of an electronic device (e.g., the electronic device 101 of FIG. 1). The processor 120 may execute instructions stored in a memory (e.g., the memory 130 of FIG. 1) to implement a software module, and may control hardware (e.g., the communication module 180 of FIG. 1) associated with the function. According to an embodiment, some of modules included in FIG. 3 may be implemented in a server (e.g., 201 in FIG. 2), and may operate in conjunction with the server 201 and the electronic device 101.

Referring to FIGS. 3 and 4, according to an embodiment, a processor (e.g., the processor 120 of FIG. 1) of the electronic device 101 may include at least one of a usage log collection module 310, a context analysis module 320, and a graphic user interface (GUI) support module 330, and a memory (e.g., the memory 130 of FIG. 1) may include a personalized context recognition model 340. According to an embodiment, the usage log collection module 310 may collect usage logs generated while the user uses the electronic device 101

The usage logs may include hardware log information or physical information and software log information or logical information.

The hardware log information or physical information may include at least one of location information, time information, and sensor information. The location information may include, for example, at least one of GPS coordinate information of the electronic device 101, network cell information obtained from a network through the communication module, and access point (AP) information connected to the electronic device 101, but the disclosure is not limited thereto. The time information may refer to a specific time when an event occurs from a timer of the electronic device 101 and may include one or more pieces of information of month, day, hour, day, minute, and second. The sensor information may include, for example, one or more pieces of sensor information obtained from various sensors (e.g., an acceleration sensor, a proximity sensor) mounted on the electronic device 101.

The software log information or logical information may include application execution information collected when the user uses an application. The app execution information may include, for example, at least one of an app identifier (e.g., app name), time information when the app is executed, time information while the app is operating, and content information executed through the app.

According to an embodiment, when the electronic device 101 is used by a plurality of users, the usage log collection module 310 may collect the usage log for each user account.

According to an embodiment, the usage log collection module 310 may transmit the collected usage logs to a server (e.g., the server 201 of FIG. 2).

The usage log collection module 310 may transmit the collected usage logs to the context analysis module 320.

The context analysis module 320 may include a first type of context recognition module 3200 and a second type of context recognition module 3210.

The first type of context recognition module 3200 may identify whether the electronic device 101 is in a predefined situation, and may recognize a first type of context (e.g., a predefine context) designated as a predefined situation.

The first type of context may include a predefined context or predetermined context defined by the electronic device 101 or the server 201 and a general or common context. The first type of context may be a context stored in the electronic device 101.

According to an embodiment, the first type of context recognition module 3200 may identify whether an application mapped with a user context is being used, and may recognize the first type of context based on the fact that the application mapped with the context is being executed. The first type of context recognition module 3200 may recognize the first type of context using app mapping information (e.g., an application—context mapping model).

For example, as illustrated in FIG. 4, when designated music apps 410a, 410b, 410c, and 410d (that is, information on apps classified as music apps are stored in advance) are executed, mapping may be performed in a manner that the electronic device 101 recognizes a context of "listening to music". When it is detected that one of the designated music apps is executed and in use, the first type of context recognition module 3200 may recognize or estimate a situation in which the user is listening to music and may recognize a first type of context (e.g., a predefined context) of "listening to music".

The second type of context recognition module 3210 may recognize a second type of context according to a result analyzed based on the usage log.

The second type of context may include an undefined context that is not predefined by the electronic device 101 or the server 201, an unknown context or undiscovered context, an individual context, or a personalized context or customized context. The second type of context may be a context generated by the electronic device 101 or the server 201 in response to a user's personal characteristic.

The second type of context recognition module 3210 may predict the second type of context according to a usage pattern corresponding to the user's personal characteristics based on the usage log and store the second type of context, and may recognize the second type of context based thereon.

According to an embodiment, the second type of context recognition module 3210 may analyze a usage log and may predict a context that is not previously defined according to a user's usage pattern. When the predicted context cannot be defined as meaningful information (e.g., when the predicted context cannot be defined as a text such as "listening to music while watching a movie at a company"), the second type of context recognition module 3210 may recognize the predicted context as an arbitrary name such as context 1 or context 2.

According to an embodiment, when the predicted context is recognized as the arbitrary name such as context 1 or context 2, the electronic device 101 may provide the recognized arbitrary context information to the user and may display a user interface on a display so that the user can directly configure the context name.

According to an embodiment, the second type of context recognition module 3210 may include an input vector conversion module 3211, a log analysis module 3212, and a personalized context generation module 3213.

The input vector conversion module 3211 may convert frequently occurring logs among the collected usage logs or usage logs collected over a configured reference value into an embedding input vector. The embedding input vector may be used as an input value of a neural network model or a clustering model.

The log analysis module 3212 may derive or acquire the usage pattern corresponding to the user's personal characteristic by analyzing user's propensity or interest using the converted input vector. For example, the log analysis module 3212 may derive the usage pattern by grouping the collected usage logs into clusters according to similar items. The log analysis module 3212 may derive the usage pattern based on the neural network model or the clustering model.

The personalized context generation module 3213 may generate the second type of context suitable for the user's personal characteristic based on the derived usage pattern and store the second type of content. For example, the personalized context generation module 3213 may generate the second type of context for usage patterns that frequently appear above a threshold value.

For example, as illustrated in FIG. 4, the electronic device 101 may cluster the usage logs to derive the usage pattern suitable for the user's propensity or interest. When a navigation app 430 is executed through the usage log in the electronic device 101, a music app (e.g., 410*a*) is executed, and a usage pattern of transmitting music to an external device through a Bluetooth 435 is analyzed, the electronic device 101 may newly generate a personalized user context (in other words, the second type of context) of "listening to music while driving" 470. Alternatively, when a music app (e.g., 410*a*) is executed and a usage pattern in which the user does not move for a predetermined time after being located at the company is analyzed, the electronic device 101 may newly generate a personalized context of "listening to music while working at the company 472". In addition, as illustrated in FIG. 4, when usage patterns of various conditions are analyzed in the electronic device 101, a personalized context according to the personal characteristic such as "listening to music while exercising 471" or "listening to music while resting at home 473" may be generated in response to the analyzed usage patterns.

The personalized context generation module 3213 may store the second type of context generated according to the usage pattern in the memory 130.

According to an embodiment, the personalized context generation module 3213 may control a context recognition model stored in the memory 130 to be updated to the personalized context recognition model 340 based on the personalized user context.

The second type of context recognition module 3310 may recognize the second type of context by determining a similarity with currently generated usage logs.

For example, the second type of context recognition module 3310 may compare the similarity of the usage logs with context feature elements defined as "listening to music while driving", and may recognize the personalized user context of "listening to music while driving" when it is determined that a situation where a music app, a navigation app, and a Bluetooth function are executed in the electronic device 101.

The input vector conversion module 3211, the log analysis module 3212, and the personalized context generation module 3213 may perform an operation by the electronic device 101 alone, or may be connected to the server (e.g., the server 201 of FIG. 2) and a network to perform complementary operations.

According to an embodiment, the electronic device 101 may provide unrecognized data that is not recognized as a personalized user context through a usage log analysis, to the server 201 through the network. The electronic device 101 may receive a result obtained by recognizing the unrecognized data as a new context from the server through integrated analysis with contexts of other electronic devices.

The GUI support module 330 may output a recommendation service for guiding a user based on a recognized context (e.g., the first type of context and the second type of context) on the display. The recommendation service may include at least one piece of recommendation information. For example, the recommendation information may be provided in the form of a list, but is not limited thereto.

The GUI support module 330 may output information on at least one of a function or an application registered in advance in relation to the recognized context.

According to an embodiment, the GUI support module 330 may output information about a usage pattern that is not recognized as a context or a context that cannot be defined as meaningful information or an arbitrary context to the display, and may provide the user with a guide on whether to store the unrecognized usage pattern as the personalized user context. The GUI support module 330 may output information on the usage pattern that is not recognized as a context as a pop-up window or through a notification bar.

For example, the GUI support module 330 may output a guidance message inquiring whether to store the unrecognized data or unrecognized usage pattern as the context on the display. The GUI support module 330 may output a user interface (UI) capable of recording a context name for the unrecognized data in response to a request for permission to store the context. The electronic device 101 may store a context name named by the user, and may store context information named by the user in the memory 130 or may update the context information to the personalized context recognition model 340 so that the context name can be used later as a context defined by the user.

The electronic device 101 according to various embodiments may include a display (e.g., the display module 160 of FIG. 1), a memory (e.g., the memory 130 of FIG. 1 or the memory 130 of FIG. 3) configured to store a usage log of the electronic device, and a processor (e.g., the processor 120 of FIG. 1 or the processor 120 of FIG. 3) configured to be connected to the memory, wherein the processor may be configured to collect the usage logs of the electronic device, to identify a usage pattern according to a user characteristic by analyzing the usage logs, to generate and store a personalized user context corresponding to an undefined situation that is not predefined in the electronic device based on the usage pattern, and to display a recommendation service to the display in response to recognizing the personalized user context.

According to various embodiments, the usage log may include sensor information and app execution information.

According to various embodiments, the processor may be configured to convert the usage log into an embedding input vector and to obtain an output value corresponding to the personalized user context by using the converted input vector as an input value of a clustering model.

According to various embodiments, the processor may be further configured to recognize a user context that is predefined in the electronic device in relation to the executed application based on information on the execution of the application, and the predefined user context may be a first type of context and the personalized user context may be a second type of context.

According to various embodiments, the processor may be configured to store the personalized user context in a public context recognition model stored in the memory and to update a personalized context recognition model.

According to various embodiments, the electronic device may further include a communication module configured to communicate with a server, wherein the processor may be configured to classify recognized data designated as the personalized user context as meaningful information and unrecognized data not designated as the user context among the analyzed usage patterns, and to transmit at least one of the collected usage logs, the recognized data, and the unrecognized data to the server.

According to various embodiments, the processor may be configured to display a user interface (UI) that guides the user on whether to store the usage pattern classified into the unrecognized data as the personalized user context, on the display.

According to various embodiments, the processor may be configured to name a context name for the unrecognized data, and to store information named to correspond to the unrecognized data by the user in the memory in response to a user input to be stored as the personalized user context or to transmit the named information to the server through the communication module.

According to various embodiments, the processor may be configured to receive result information in which data analyzed as noise in the electronic device is recognized as a new context by performing integrated analysis with contexts of the other electronic devices from the server, through the communication module.

According to various embodiments, when the server analyzes that context data of another electronic device having a similar value equal to or greater than a predetermined reference value to at least one of the usage pattern of the electronic device or the personalized user context exists, the processor may be configured to receive a context recognition service from the server based on the context data of the other electronic device and to display the received recommendation service on the display.

Figure 5:
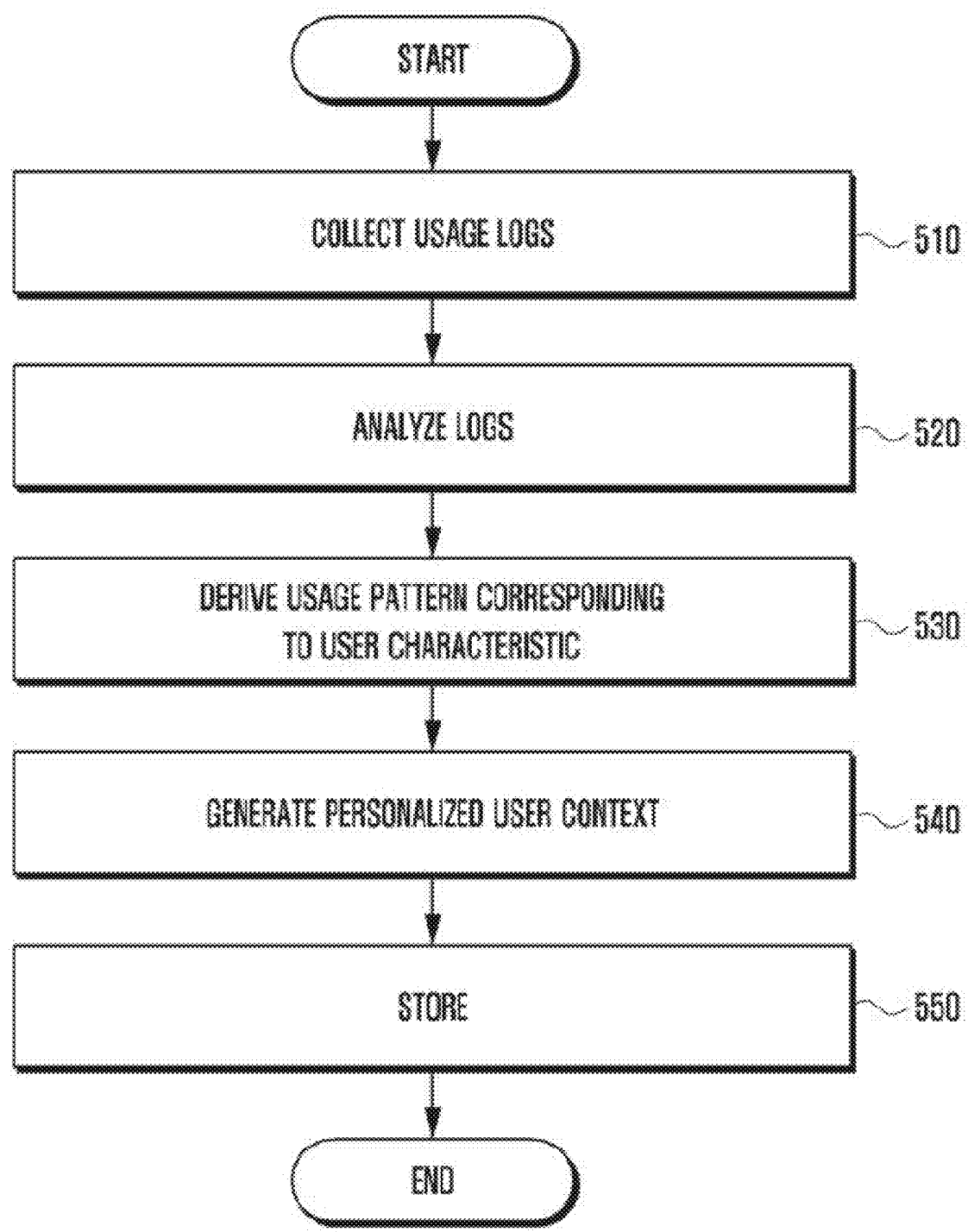
FIG. 5 illustrates a personalized context recognition service method of an electronic device according to various embodiments.

FIG. 5 illustrates a personalized context recognition service method of an electronic device according to various embodiments of the disclosure.

Referring to FIG. 5, according to an embodiment, in operation 510, a processor (e.g., the processor 120 of FIG. 3) of the electronic device 101 may collect usage logs generated while the user uses the electronic device 101.

For example, the processor 120 may collect hardware log information such as sensor information and may collect software log information such as app execution information.

According to an embodiment, the processor 120 may store the collected usage logs in a memory (e.g., the memory 130 of FIG. 3).

In operation 520, the processor 120 may analyze the usage logs. In operation 530, the processor 120 may derive a usage pattern corresponding to a user's personal characteristic.

According to an embodiment, the processor 120 may convert the collected usage logs into an embedding input vector, and may derive a usage pattern that is frequently used by equal to or greater than a predetermined reference value by using the embedding input vector as an input value of a clustering model to group the usage logs into clusters according to similar items.

In operation 530, the processor 120 may predict and generate personalized user contexts suitable for the user's personal characteristic according to the usage pattern.

In operation 540, the processor 120 may store the personalized user context.

According to an embodiment, the processor 120 may update a context recognition model based on the personalized user context.

The processor 120 may recognize a second type of context (e.g., undefined context or personalized context) based on the personalized user context. For example, the electronic device 101 may determine whether a situation condition corresponding to the personalized user context occurs by comparing similarity between the currently collected usage logs and the characteristics of the context, thereby recognizing the second type of context.

According to an embodiment, the processor 120 may recognize the second type of context (e.g., undefined context or personalized context,) based on the app execution information.

Figure 6:
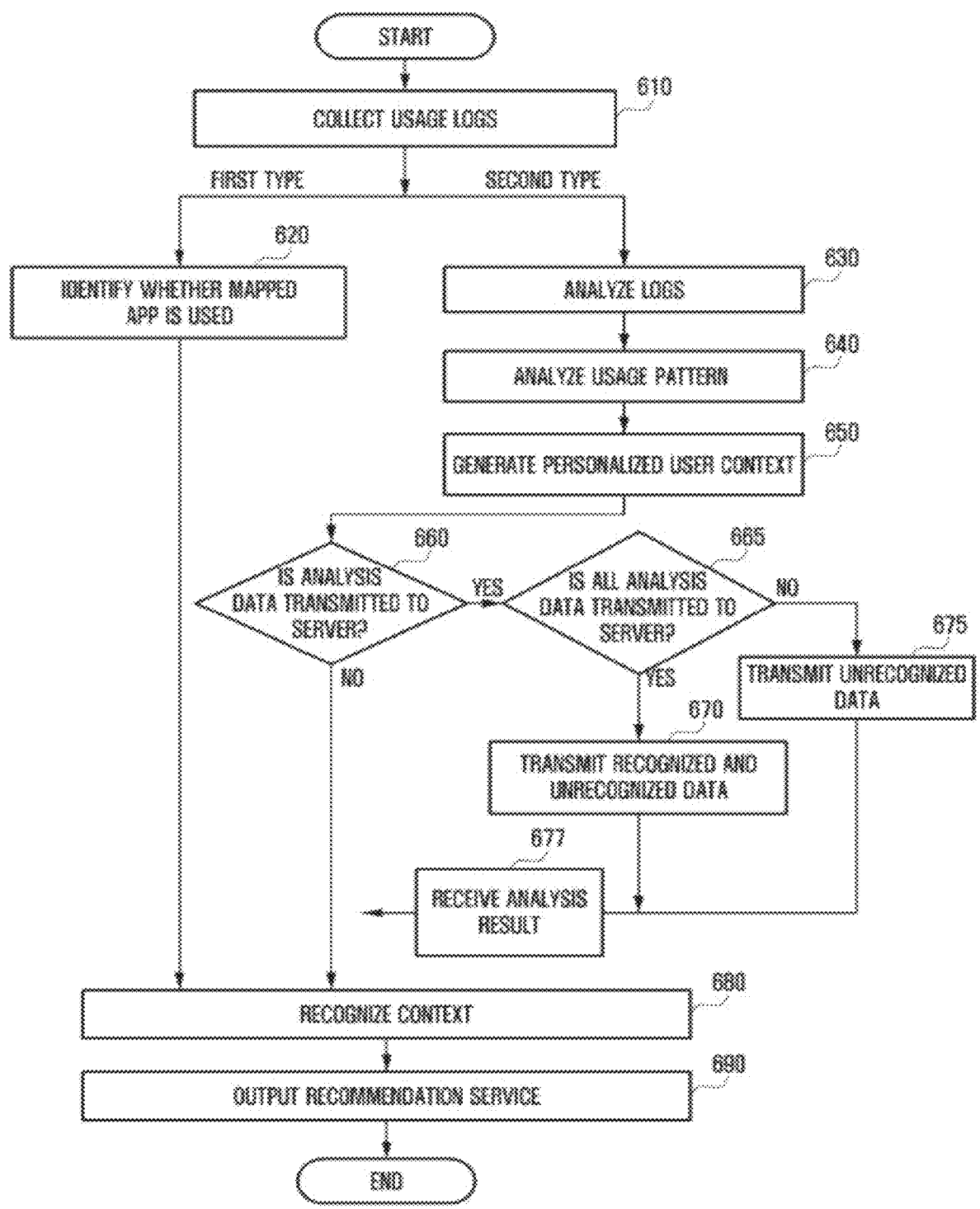
FIG. 6 is a diagram illustrating a personalized context recognition service method of an electronic device according to various embodiments.
Figure 7:
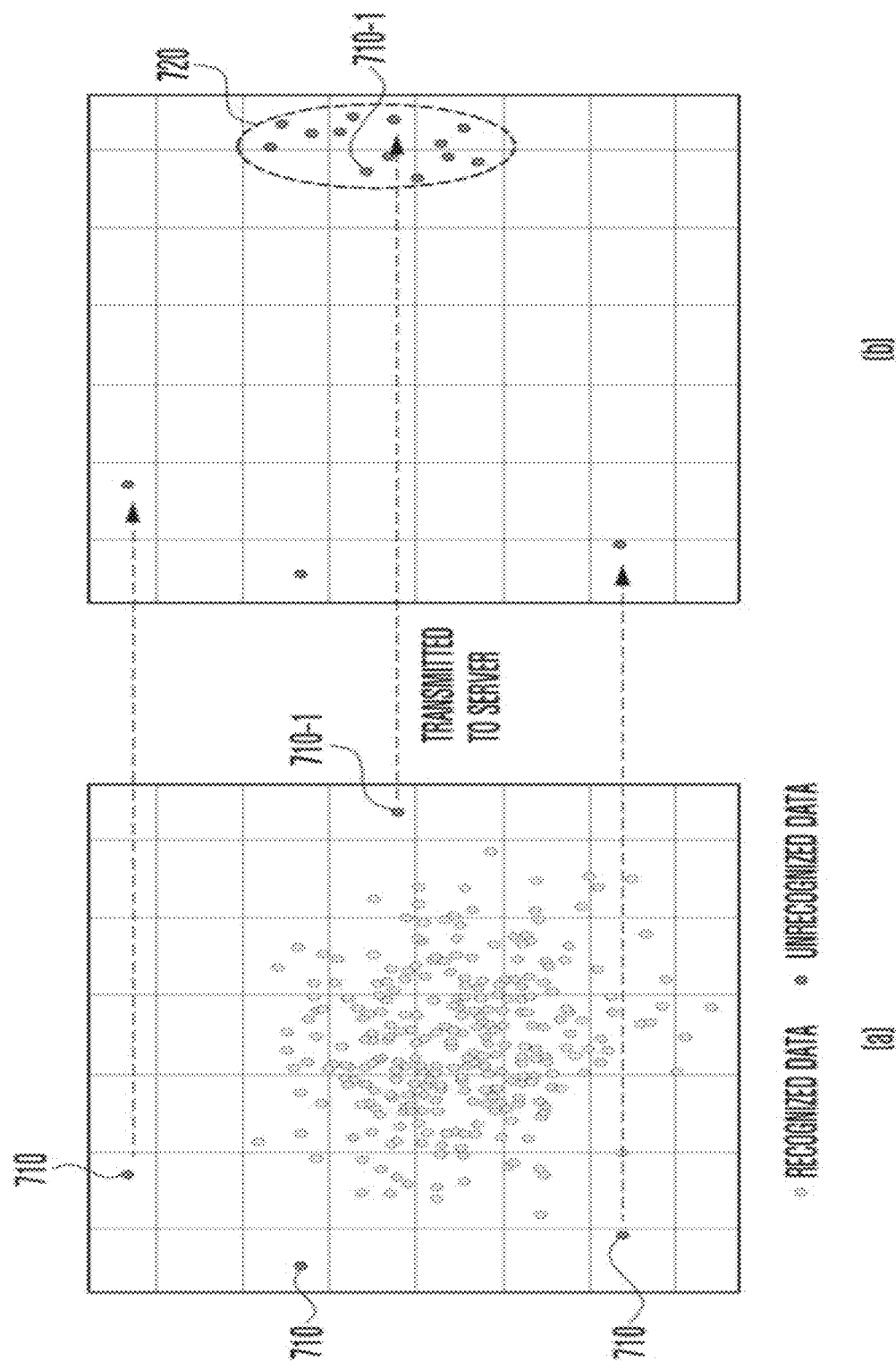
FIG. 7 illustrates an example describing log analysis data according to various embodiments.

FIG. 6 is a diagram illustrating a personalized context recognition service method of an electronic device according to various embodiments of the disclosure, and FIG. 7 illustrates an example describing log analysis data according to various embodiments.

Referring to FIGS. 6 and 7, according to an embodiment, in operation 610, a processor (e.g., the processor 120 of FIG. 3) of the electronic device 101 may collect usage logs generated while the user uses the electronic device 101.

For example, the processor 120 may collect hardware log information such as sensor information and collect software log information such as app execution information.

According to an embodiment, the processor 120 may store the collected usage logs in a memory (e.g., the memory 130 of FIG. 3).

According to an embodiment, the processor 120 may transmit the collected usage logs to a server (e.g., the server 201 in FIG. 2) supporting a context recognition system through a network, and operations 630 to 650 may be performed in the server.

The processor 120 may branch to operation 620 to recognize a first type of context, and may branch to operation 630 to recognize a second type of context.

Operations 620 and 630 are only separated for convenience of explanation, and depending on situations, the processor 120 may proceed from operation 620 to operation 680 and operation 690 to support a context-aware service, or may proceed from operation 620 to operation 630 to 670 or to operation 680 and 690 to support the context-aware service.

For example, in order to recognize the first type of context, in operation 620, the processor 120 may identify whether an app mapped to a predefined context is being used.

As an example, the processor 120 may identify whether an app included in an application-context mapping model operates.

In operation 680, in response to the execution of the app included in the application-context mapping model, the processor 120 may recognize a context corresponding to the executed app.

As another example, in order to recognize the second type of context, in operation 630, the processor 120 may analyze the usage logs. In operation 640, the processor 120 may derive a usage pattern corresponding to a user's personal characteristic based on the usage logs.

According to an embodiment, the processor 120 may convert the collected usage logs into an embedding input vector, and may derive a usage pattern that is frequently used by equal to or greater than a predetermined reference value by using the embedding input vector as an input value of a clustering model to group the usage logs into clusters according to similar items.

In operation 650, the processor 120 may generate a personalized user context suitable for the user's personal characteristics by analyzing the usage pattern.

The processor 120 may store the personalized user context or may update the context recognition model based on the personalized user context.

In operation 660, the processor 120 may identify whether to transmit analysis data to the server 201 by identifying whether the context recognition system interworks with the server 201.

For example, the processor 120 may proceed to operation 665 when the context recognition system is configured to interwork with the server 201, and may proceed to operation 680 when the context recognition system is configured not to interwork with the server or a network connection is not smoothly performed.

In operation 665, the processor 120 may determine whether to transmit all analysis data to the server 201. When all the analysis data is configured to be transmitted to the server, the processor 120 may proceed to operation 670 to transmit data recognized as the personalized user context and unrecognized data to the server 201. The processor 120 may transmit data related to the usage pattern to the server 201.

In this case, the server 201 may compare and integrally analyze usage pattern data of the user with usage pattern data collected from other electronic devices or user devices of other accounts, thereby deriving a result in which data that is not analyzed or unrecognized by the electronic device 101 is recognized as a new context.

For example, the server 201 may derive a result in which the usage log classified as noise by the electronic device 101 is recognized as the new context through integrated data analysis of the electronic device 101 and the other electronic devices.

Referring to (a) of FIG. 7, when the usage logs are clustered by the electronic device 101, data within a predetermined range may be recognized as a context (e.g., recognized data), but as illustrated in (a) of FIG. 7, logs that do not frequently appear or exceed the predetermined range may be analyzed as noise 710 and classified as unrecognized data. However, referring to (b) of FIG. 7, the server 201 may integrally analyze the unrecognized data classified as noise 710 by the electronic device 101 with data of the other electronic devices to identify whether the unrecognized data is noise or new data. When a portion of the noise 710-1 is recognized as a context 720 of the other electronic devices, the server 201 may classify the noise 710-1 as a meaningful context, and may provide result information in which the noise 710-1 is recognized as the context 720 to the electronic device 101.

When only the unrecognized data is configured to be transmitted to the server 201, the processor 120 may proceed to operation 675 to transmit only the unrecognized data to the server. In this case, since the server 201 analyzes only the unrecognized data, data transmission traffic between the electronic device 101 and the server 201 can be reduced.

In operation 677, the processor 120 may receive analysis information on the unrecognized data from the server 201.

In operation 680, the processor 120 may recognize a first type of context (e.g., a predefined context) based on whether the app is used, and may recognize a second type of context (e.g., undefined context or personalized context) based on the personalized user context.

For example, when a music app and a context of "listening to music" are predefined, the processor 120 may detect that the music app is in operation and may recognize a context for situation-aware of "listening to music" based on the detected information.

For another example, the processor 120 may compare the similarity of the currently collected usage logs to identify whether a situation condition (e.g., execution of a music app or indoor location) corresponding to the personalized user context occurs, thereby recognizing a user context (or a personalized user context) to which a personal situation of "listening to music while resting at home" is reflected.

In operation 690, the processor 120 may output recommendation information (e.g., a recommendation function or a recommendation service) through the display in response to the recognized context.

Figure 8:
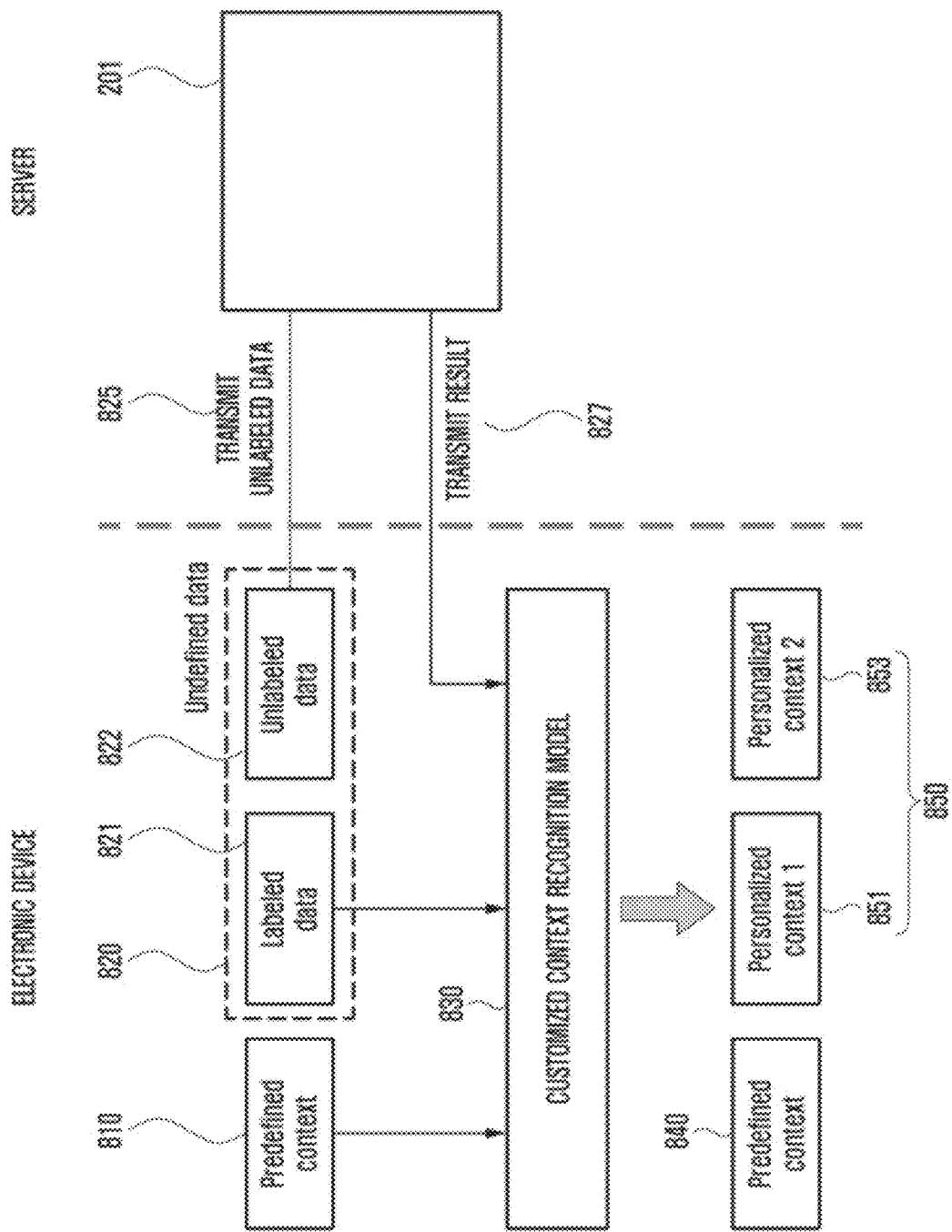
FIG. 8 illustrates an example describing a context recognition model according to various embodiments.

FIG. 8 illustrates an example describing a context recognition model according to various embodiments.

Referring to FIG. 8, according to an embodiment, the electronic device 101 may support a function of updating a common context recognition model to a customized context recognition model 830 based on at least one of a user context (in other words, a personalized user context) generated by analyzing a usage log of the electronic device 101 or a new context that is not analyzed by the electronic device 101 from the server 201.

The customized context recognition model 830 may include data (e.g., predefined data) 810 for recognizing a first type of context and data (e.g., undefined data) 820 for recognizing a second type of context. The predefined data 810 may be data included in a common context recognition model. For example, the predefined data 810 may be data for recognizing a general or common context, such as "while exercising", "while working", "while driving", or "while shopping".

The undefined data 820 may be data stored to recognize a personalized user context generated according to a user's personal characteristic by analyzing the usage log by the electronic device 101. The undefined data 820 may include data (e.g., labeled data) 821 that is recognized as a context through log analysis (e.g., clustering) and data (e.g., unlabeled data) 822 that is analyzed as noise by the electronic device 101 and requires integrated analysis by the server.

The electronic device 101 may transmit in operation 825 data (e.g., unlabeled data) in which the usage pattern analyzed by log analysis is not recognized as a context or classified as noise, to the server 201. The server 201 may integrally analyze data transmitted from the electronic device 101 with data of other electronic devices to classify the analyzed data as noise or recognize the analyzed data as a new meaningful context, and may transmit the classified and recognized information to the electronic device 101.

The electronic device 101 may receive in operation 827 result data (e.g., result transmission) recognized from the unlabeled data through integrated analysis with other electronic devices from the server 201, and may update the received result data to the customized context recognition model 830. The electronic device 101 may update the customized context recognition model 830.

The electronic device 101 may recognize a context by performing context-aware based on the updated customized context recognition model 830.

The electronic device 101 may recognize a personalized user context analyzed through the usage logs and newly generated, that is, a second type of context 850 (e.g., a personalized context 1 851 or a personalized context 2 853) as well as a context predefined in the electronic device 101, that is, a first type of context 840 (e.g., a predefined context), thereby providing a personalized context-aware service optimized for the user to the user. Here, the personalized context 1 851 may be a personalized user context predicted based on the data (e.g., labeled data) recognized as the context through log analysis (e.g., clustering). The personalized context 2 853 may be a personalized user context predicted through information obtained through integrated analysis of data (e.g., unlabeled data) not analyzed by the electronic device 101 with other electronic devices in the server.

The electronic device 101 may recommend different context-aware services for each user even if the same application is used by recognizing the personalized user context reflecting user characteristics.

Figure 9:
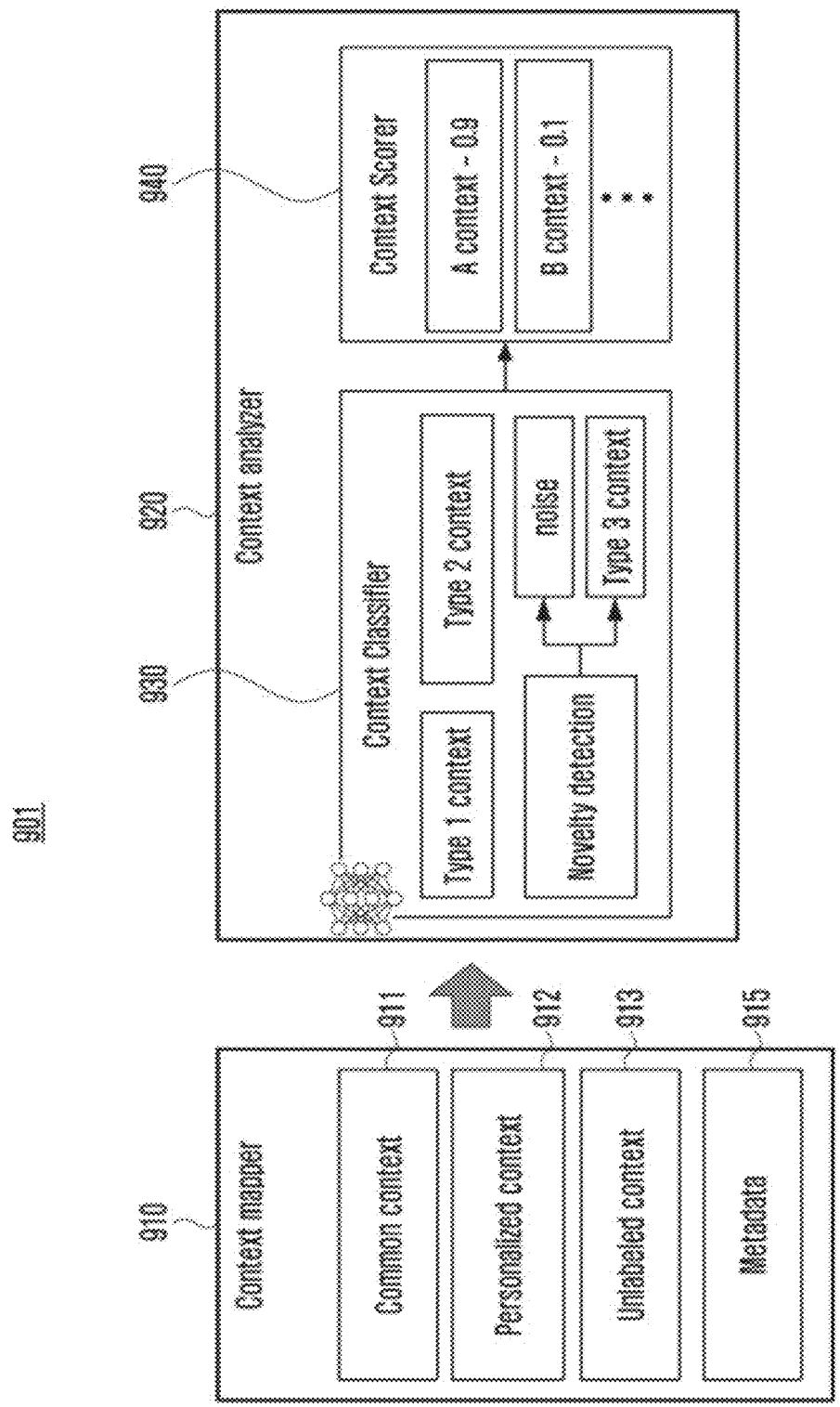
FIG. 9 illustrates a configuration of a server supporting a context-aware service according to various embodiments.

FIG. 9 illustrates a configuration of a server supporting a context-aware service according to various embodiments of the disclosure.

Referring to FIG. 9, a server 901 according to an embodiment may collect user contexts of an electronic device (e.g., the electronic device 101 of FIG. 1), and may support a function of performing integrated analysis of contexts and a function of recommending and guiding a service suitable for a situation of the electronic device 101 by determining similarity for each context. The electronic device 101 may interwork with the server 901 to guide the user to a recommendation service or function corresponding to the user context.

According to an embodiment, the server 901 may include a context mapping module 910 (e.g., context mapper) and a context analysis module 920 (e.g., context analyzer).

The context mapping module 910 may collect context data or usage log information transmitted from the electronic device 101 for each electronic device or for each user account.

For example, the context mapping module 910 may acquire at least one of a first type of context 911 (e.g., a common context) from the electronic device 101, a second type of context 912 (e.g., a personalized context, a customized context, or a labeled context) that is recognized by log analysis (e.g., clustering) of the electronic device 101, a third type context 913 (e.g., unlabeled context) that is analyzed as noise by the electronic device 101 and requires integrated analysis of the server.

The context mapping module 910 may map data 915 (e.g., metadata) stored in the server and feature elements of the context transmitted from the electronic device, and may transmit the mapped result information (e.g., input data) to the context analysis module 920. The data (e.g., metadata) stored in the server may include app-related information (e.g., category information or app detailed information), but the disclosure is not limited thereto. Various types of information necessary for context analysis, such as location information of the electronic device 101 may be stored as metadata. For example, the data (e.g., metadata) stored in the server may be stored based on usage log information of the electronic device 101.

In FIG. 9, the corresponding context is classified into the second type of context 912 and the third type context 913, but this is for illustrative purposes only, and according to an embodiment, the third type context 913 may be integrally classified into the second type of context 912.

The context analysis module 920 may include a context classifier 930 and a context scorer 940.

The context classifier 930 may classify and manage contexts based on the result information (e.g., input data) transmitted from the context mapping module 910. The context classifier 930 may perform a function of integrating and analyzing data transmitted from the electronic device 101 with data of other electronic devices to classify the analyzed data as noise or to determine the analyzed data as a new meaningful context. The context scorer 940 may comparatively evaluate (e.g., score) the collected contexts, and may transmit the result to the electronic device 101.

For example, the context scorer 940 may gather or group contexts associated with a specific context recognized by the electronic device 101. The context scorer 940 may use an association score to extract groups. The association score may increase along with an increase in the number of feature elements associated with feature elements included in each context.

The context scorer 940 may select a function or service having the association score (e.g., an accuracy score) higher than a reference threshold value based on the specific context recognized by the electronic device 101, and may transmit information on the selected function and service to the electronic device 101 as recommendation service information. The context scorer 940 may select a predetermined number of recommended functions in descending order from the highest association score (e.g., the accuracy score).

Figure 10:
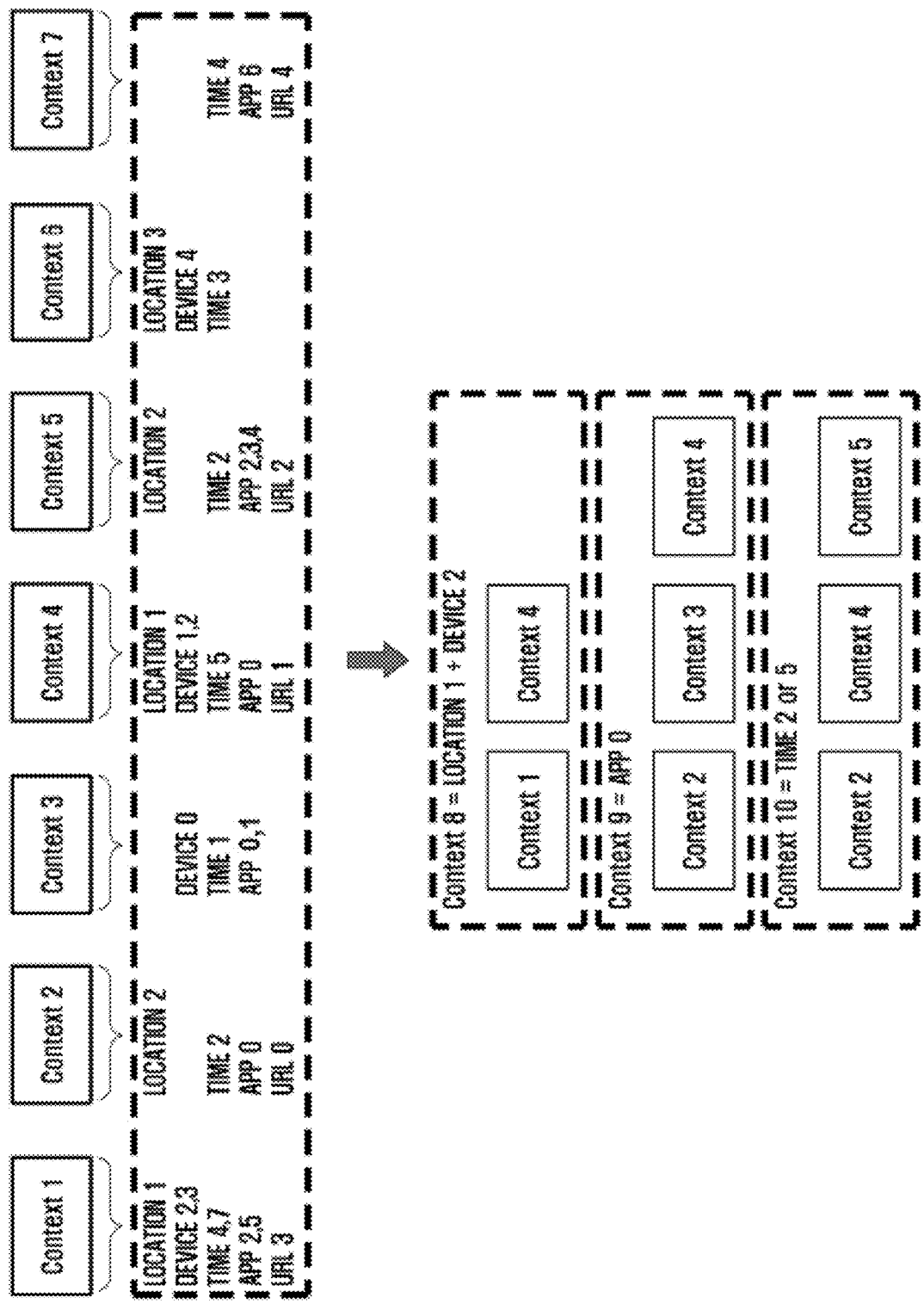
FIG. 10 illustrates an example of a context combination according to various embodiments.

FIG. 10 illustrates an example of a context combination according to various embodiments.

Referring to FIG. 10, according to an embodiment, the electronic device 101 may combine user contexts generated by analyzing usage logs to generate a higher-level user context and may support a function of recognizing the generated user context.

For example, the electronic device 101 may support to generate user contexts 1 to 7 (that is, context 1, context 2, context 3, context 4, context 5, context 6, and context 7) as personalized user contexts and to recognize the personalized user contexts by analyzing the usage logs.

The electronic device 101 may generate a new level of context by combining contexts having the same feature according to a configuration. For example, when it is analyzed that the user frequently uses a specific place (e.g., location 1) other than a designated place (e.g., home or company) (e.g., located in the specific place more than a predetermined number of times), the electronic device 101 may newly combine context 1 and context 4 including the feature of location 1 to generate a new level of context 8 for a situation related to location 1, and may recognize the generated new level of context 8. As another example, the electronic device 101 may generate a new level of context 9 by combining context 2, context 3 and context 4 including features related to a specific app (e.g., app 0), and may generate a new level of context 10 by combining context 2, context 4 and context 5 including features related to a specific time (e.g., time 2 or 5).

Figure 11:
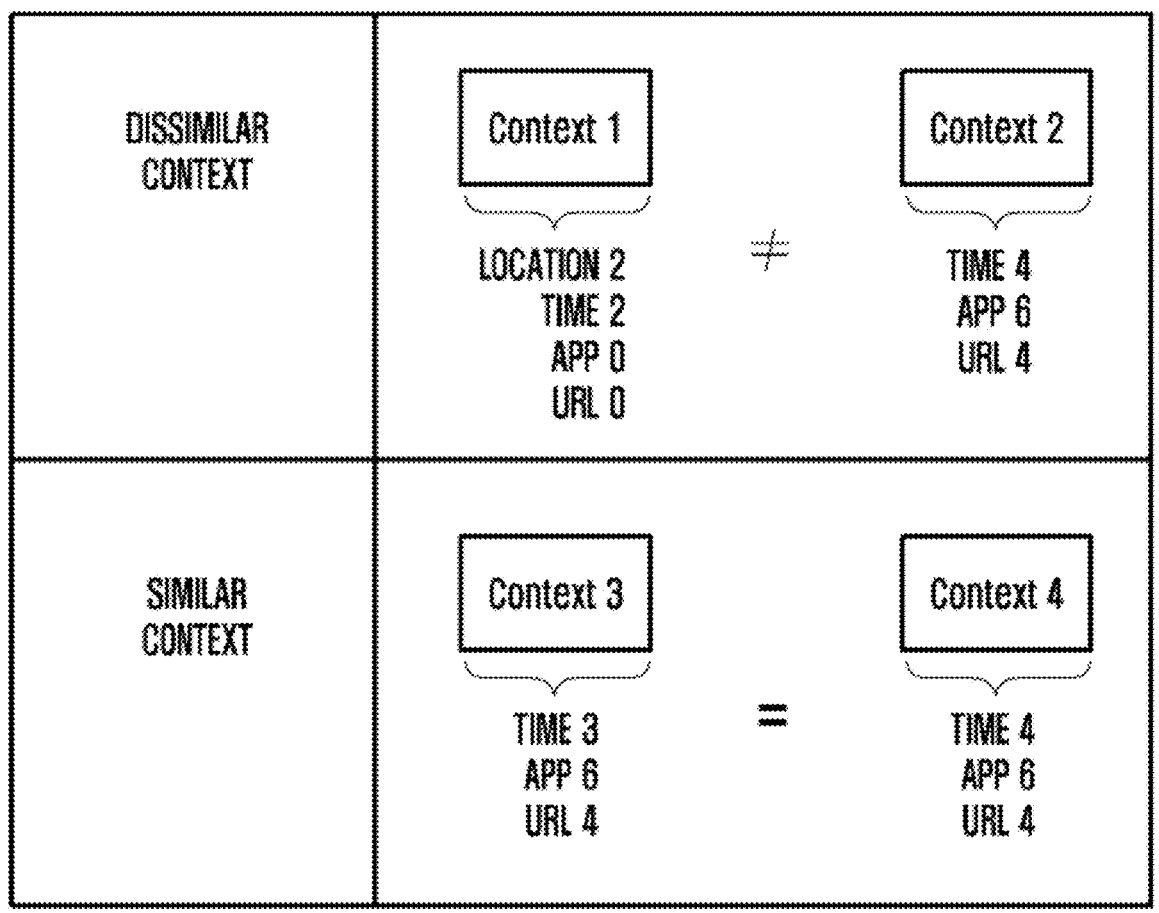
FIG. 11 illustrates an example of providing a context-based recommendation service according to various embodiments.

FIG. 11 illustrates an example of providing a context-based recommendation service according to various embodiments.

Referring to FIG. 11, according to an embodiment, an electronic device (e.g., the electronic device 101 of FIG. 1) may interwork with a server (e.g., the server 201 of FIG. 2) to recommend a user context suitable for a situation of the electronic device 101 based on similarity between the user contexts.

For example, when context 1 has feature elements of location 2, time 2, app2, and URL 0, and context 2 has feature elements of time 4, app 6, and URL 4, the electronic device 101 (or the server 201) may determine that context 1 and context 2 are not similar to each other. On the other hand, when context 3 and context 4 have feature elements of time 3, app 6, and URL 4, the electronic device 101 or the server 201 may determine that context 3 and context 4 are similar contexts, and may provide a context recognition or recommendation service based on the determination information.

For example, context 3 having the feature elements of time 3, app 6, and URL 4 may be generated as a personalized user context by user device 1, and recommendation service 1 corresponding to context 3 may be guided. The server 201 may recommend recommendation service 1 to user device 2 as the recommendation information for context 3 by identifying the similarity between context 4 and context 3 generated in user device 2.

Figure 12:
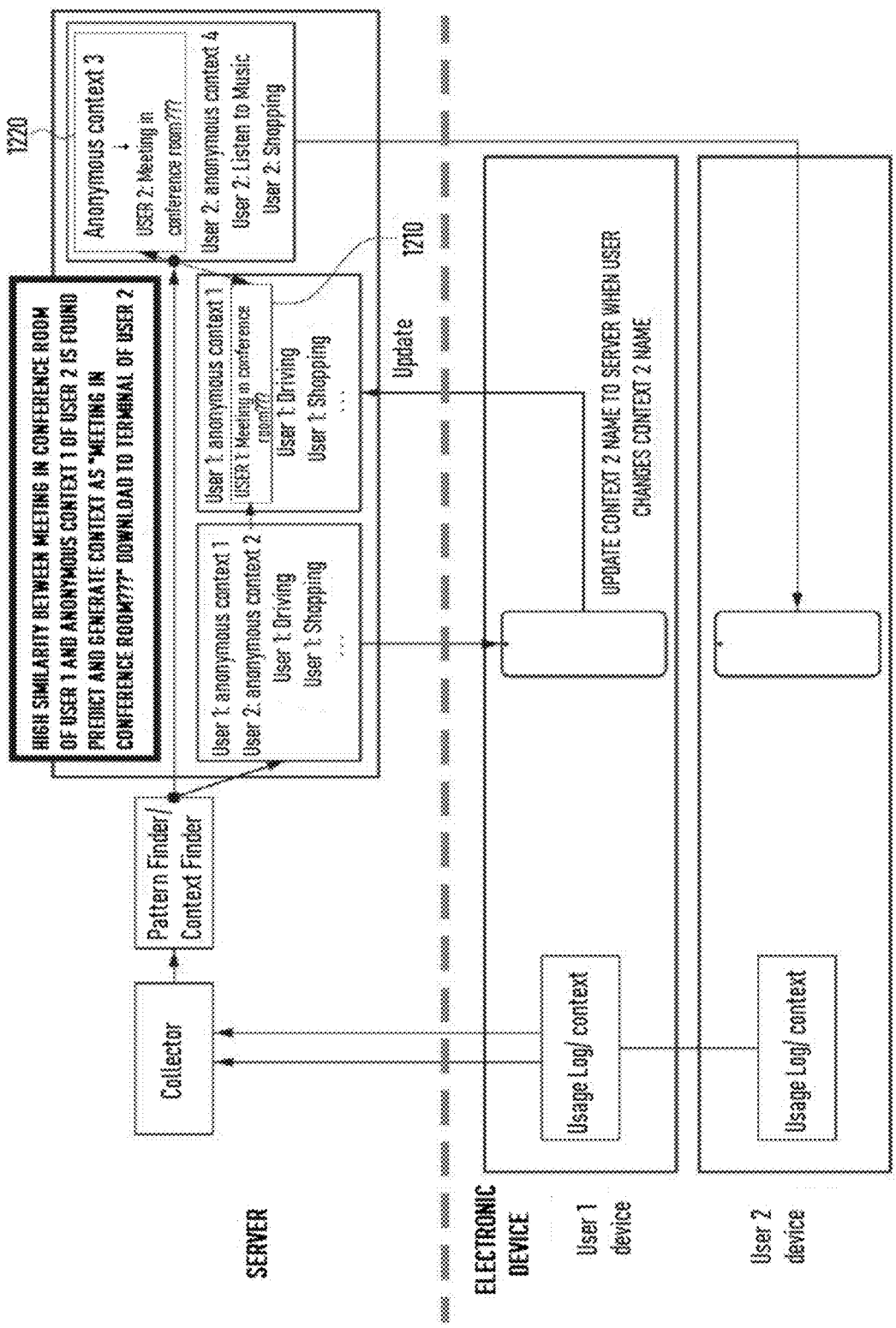
FIGS. 12 and 13 illustrate a situation in which a personalized context recognition service is provided according to various embodiments.
Figure 13:
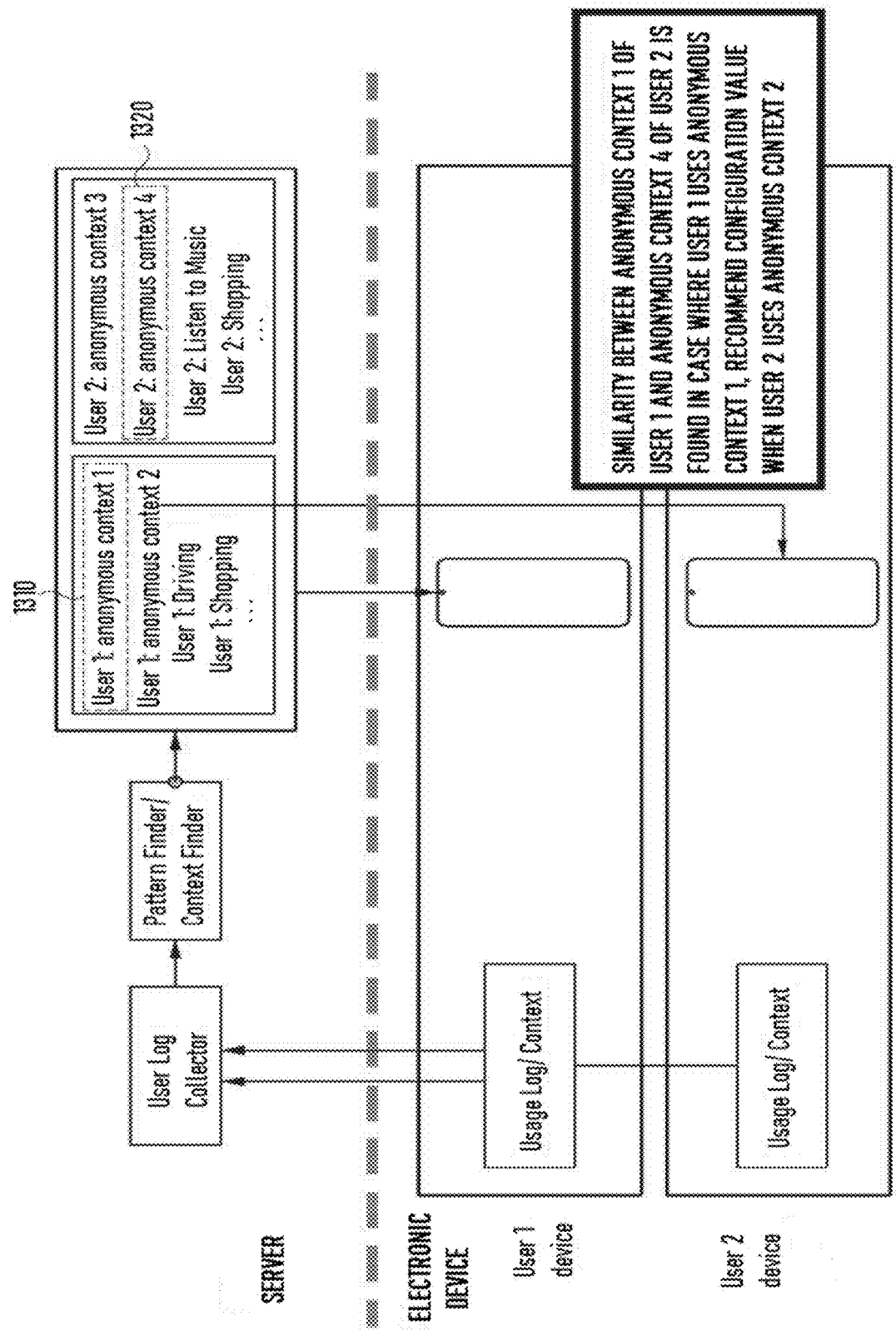

FIGS. 12 and 13 illustrate a situation in which a personalized context recognition service is provided according to various embodiments of the disclosure.

Referring to FIGS. 12 and 13, an electronic device (e.g., the electronic device 101 of FIG. 1) according to an embodiment may support a function of recommending and proposing a name of a context that is not designated in advance and a function of comparing a corresponding context with that of another electronic device and providing a recommendation service, in conjunction with the server (e.g., the server 201 of FIG. 2).

According to an embodiment, user device 1 may transmit a usage log or a context analyzed based on the usage log to the server, and the electronic device 101 of user device 2 may also transmit the usage log or the context to the server 201.

The server 201 may compare and analyze the usage log or context of user device 1 and user device 2.

For example, as illustrated in FIG. 12, the server 201 may identify the contexts (e.g., anonymous context 1, anonymous context 2, driving, or shopping) collected from user device 1. In this case, there may be anonymous context 1 and anonymous context 2 of which name cannot be specified although they are recognized as the context by user device 1. User device 1 may provide information about anonymous context 1 and anonymous context 2 to the user and may guide the user to request a name.

When user 1 names a situation for anonymous context 2 as "meeting in conference room", user device 1 may update the name of anonymous context 2 to "meeting in conference room".

On the other hand, the server 201 may identify contexts (anonymous context 3, anonymous context 4, listen to music, and shopping) collected from user device 2, and may recommend and provide information of anonymous context 2 (e.g., "meeting in conference room") named by user device 1 when it is determined that the feature element of anonymous context 3 among the identified contexts is similar to anonymous context 2 of user device 1. User device 2 may recognize the context of "meeting in conference room", and may provide a recommendation service based on the recognized context to user 2.

For example, as illustrated in FIG. 13, the server 201 may compare and analyze the contexts (e.g., anonymous context 1, anonymous context 2, driving, shopping) collected from user device 1 with the contexts (anonymous context 3, anonymous context 4, listen to music, shopping) collected from user device 2. The server may analyze that anonymous context 1 of user device 1 and anonymous context 4 of user device 2 have a predetermined level of similarity or more. The server 201 may identify a configuration value of a function or service provided when anonymous context 4 is recognized by user device 1, and may provide a configuration value of the identified user device 1 to user device 2 as recommendation information when anonymous context 4 is recognized by user device 2.

According to various embodiments, a situation-aware service method of an electronic device may include collecting usage logs of the electronic device, identifying a usage pattern according to a user characteristic by analyzing the usage log, generating and storing a personalized user context corresponding to an un-defined situation that is not predefined in the electronic device based on the usage pattern, and displaying a recommendation service to the display in response to recognizing the personalized user context.

According to various embodiments, the usage log may include sensor information and app execution information.

According to various embodiments, the generating and storing of the personalized user context may include converting the usage log into an embedding input vector and obtaining an output value corresponding to the personalized user context by using the converted input vector as an input value of a clustering model.

According to various embodiments, the situation-aware service method may further include detecting execution of an application, and recognizing a user context that is predefined in the electronic device in relation to the executed application based on the execution of the application, wherein the predefined user context may be a first type of context and the personalized user context may be a second type of context.

According to various embodiments, the generating and storing of the personalized user context may further include storing the personalized user context in a public context recognition model stored in the electronic device and updating a personalized context recognition model.

According to various embodiments, the identifying of the usage pattern according to the user's characteristic by analyzing the usage log may further include classifying recognized data designated as the personalized user context as meaningful information and unrecognized data not designated as the user context among the analyzed usage patterns, and transmitting at least one of the collected usage logs, the recognized data, and the unrecognized data through a communication module to the server according to a configuration of the electronic device.

According to various embodiments, the situation-aware service method may further include, after the classifying of the unrecognized data, displaying a user interface (UI) that guides the user on whether to store the usage pattern classified into the unrecognized data as the personalized user context, on the display.

According to various embodiments, the situation-aware service method may further include, after the displaying of the UI on the display, naming a context name for the unrecognized data; and storing information named to correspond to the unrecognized data by the user in the memory in response to a user input to be stored as the personalized user context or transmitting the named information to the server through the communication module.

According to various embodiments, the situation-aware service method may further include, after the transmitting of the at least one of the usage log, the recognized data, and the unrecognized data to the server, receiving result information in which the unrecognized data is recognized as a new context by performing integrated analysis with contexts of the other electronic devices from the server, through the communication module.

According to various embodiments, the outputting of the recommendation service to the display may further include, when the server analyzes that context data of another electronic device having a similar value equal to or greater than a predetermined reference value to at least one of the usage pattern of the electronic device or the personalized user context exists, receiving a recommendation service corresponding to a situation recognized based on the context data of the other electronic device from the server, and outputting the received recommendation service to the display.

According to various embodiments, personalized user context conforming to the user's individual preferences may be recognized, thereby recommending a different service to each user even in the case of the same application.

According to various embodiments, personalized user contexts generated by an electronic device different from a personalized user context generated by the electronic device may be integrated/analyzed, thereby recommending a CAS tailored to individual users.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a recording medium or a storage medium (e.g., internal memory 136 or external memory 138) that is readable by a machine (e.g., the electronic device 101). For example, a processor (e.g., the processor 120) of the machine (e.g., the electronic device (101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a display;
    a processor; and
    a memory storing instructions executable by the processor,
    wherein the processor is connected to the memory and configured to execute the instructions to:
        identify whether an application installed in the electronic device and mapped to a predefined user context predefined in the electronic device is being executed in the electronic device,
        based on the application being executed in the electronic device, recognize the predefined user context by using information on mapping between the application and the predefined user context,
        collect usage logs of the electronic device and store the collected usage logs in the memory,
        identify a usage pattern according to a user characteristic by analyzing the stored usage logs,
        generate a personalized user context of a first level corresponding to feature elements related to an undefined situation that is not predefined in the electronic device based on the usage pattern, and
        control the display to output a recommendation function related to the recognized predefined user context or the personalized user context in the display in response to recognizing the predefined user context or the personalized user context,
    wherein the processor is further configured to execute the instructions to identify the usage pattern by grouping the collected usage logs into clusters according to similar items of the collected usage logs based on a clustering model,
    wherein the feature elements comprise at least one of location information, application information, time information, uniform resource locator (URL) information, and device information, and
    wherein the processor is further configured to generate a personalized user context of a second level by combining personalized user contexts of the first level having a same feature element related to the undefined situation.

2. The electronic device of claim 1, wherein the usage logs comprise sensor information and app execution information.

3. The electronic device of claim 1, wherein the processor is further configured to: as an operation of grouping the collected usage logs,
    convert the usage logs into an embedding input vector, and
    obtain an output value corresponding to the personalized user context by using the converted input vector as an input value of the clustering model.

4. The electronic device of claim 1, wherein the processor is further configured to execute the instructions to:
store the personalized user context in a public context recognition model stored in the memory, and
update a personalized context recognition model.

5. The electronic device of claim 1, further comprising a communication module configured to communicate with a server,
wherein the communication module comprises one or more communication processors,
wherein the processor is further configured to execute the instructions and control the communication module to:
classify recognized data designated as the personalized user context as meaningful information and unrecognized data not designated as the user context among analyzed usage patterns, and
transmit at least one of the collected usage logs, the recognized data, and the unrecognized data to a server.

6. The electronic device of claim 5, wherein the processor is further configured to execute the instructions to display a user interface (UI) that provides the user with a guide on whether to store the usage pattern classified into the unrecognized data as the personalized user context, on the display.

7. The electronic device of claim 6, wherein the processor is further configured to execute the instructions to:
name a context name for the unrecognized data, and
store information named to correspond to the unrecognized data by the user in the memory in response to a user input to be stored as the personalized user context or transmit the named information to the server.

8. The electronic device of claim 5, wherein the processor is configured to execute the instructions to receive result information in which data analyzed as noise in the electronic device is recognized as a new context by performing integrated analysis with contexts of other electronic devices from the server.

9. The electronic device of claim 5, wherein, when the server analyzes that context data of another electronic device having a similar value equal to or greater than a predetermined reference value to at least one of the usage pattern of the electronic device or the personalized user context exists, the processor is further configured to execute the instructions to:
receive a recommendation service corresponding to a situation recognized based on the context data of the another electronic device from the server, and
display the received recommendation service on the display.

10. A method for providing a situation-aware service of an electronic device, the method comprising:
identifying whether an application installed in the electronic device and mapped to a predefined user context predefined in the electronic device is being executed in the electronic device,
based on the application being executed in the electronic device, recognizing the predefined user context by using information on mapping between the application and the predefined user context,
collecting usage logs of the electronic device and storing the collected usage logs in a memory;
identifying a usage pattern according to a user characteristic by analyzing the stored usage logs;
generating a personalized user context of a first level corresponding to feature elements related to an undefined situation that is not predefined in the electronic device based on the usage pattern; and
displaying a recommendation function related to the recognized predefined user context or the personalized user context in a display in response to recognizing the predefined user context or the personalized user context,
wherein the identifying of the usage pattern comprises identifying the usage pattern by grouping the collected usage logs into clusters according to similar items of the collected usage logs based on a clustering model,
wherein the feature elements comprise at least one of location information, application information, time information, uniform resource locator (URL) information, and device information, and
wherein the method further comprises generating a personalized user context of a second level by combining personalized user contexts of the first level having a same feature element related to the undefined situation.

11. The method of claim 10, wherein the grouping of the collected usage logs comprises:
converting the usage logs into an embedding input vector; and
obtaining an output value corresponding to the personalized user context by using the converted input vector as an input value of the clustering model.

12. The method of claim 10, wherein the identifying of the usage pattern according to the user characteristic by analyzing the usage logs further comprises:
classifying recognized data designated as the personalized user context as meaningful information and unrecognized data not designated as the user context among analyzed usage patterns; and
transmitting at least one of the collected usage logs, the recognized data, and the unrecognized data to a server according to a configuration of the electronic device.

13. The method of claim 12, after the classifying of the unrecognized data, further comprising:
displaying a user interface (UI) that provides a user with a guide on whether to store the usage pattern classified into the unrecognized data as the personalized user context, on the display,
receiving a user input for naming a context name for the unrecognized data and storing the named context name as the personalized user context; and
storing information named to correspond to the unrecognized data by the user in a memory in response to a user input to be stored as the personalized user context or transmitting the named information to the server.

14. The method of claim 12, after the transmitting of the at least one of the usage logs, the recognized data, and the unrecognized data to the server, further comprising:
receiving result information in which the unrecognized data is recognized as a new context by performing integrated analysis with contexts of other electronic devices from the server, and
wherein the outputting of the recommendation service to the display further comprises:
when the server analyzes that context data of another electronic device having a similar value equal to or greater than a predetermined reference value to at least one of the usage pattern of the electronic device or the personalized user context exists, receiving a recommendation service corresponding to a situation recognized based on the context data of the another electronic device from the server, and outputting the received recommendation service to the display.

* * * * *